Figure 5:
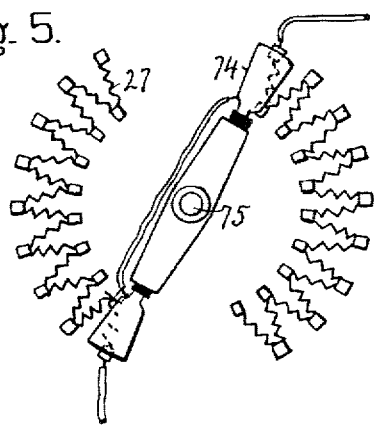

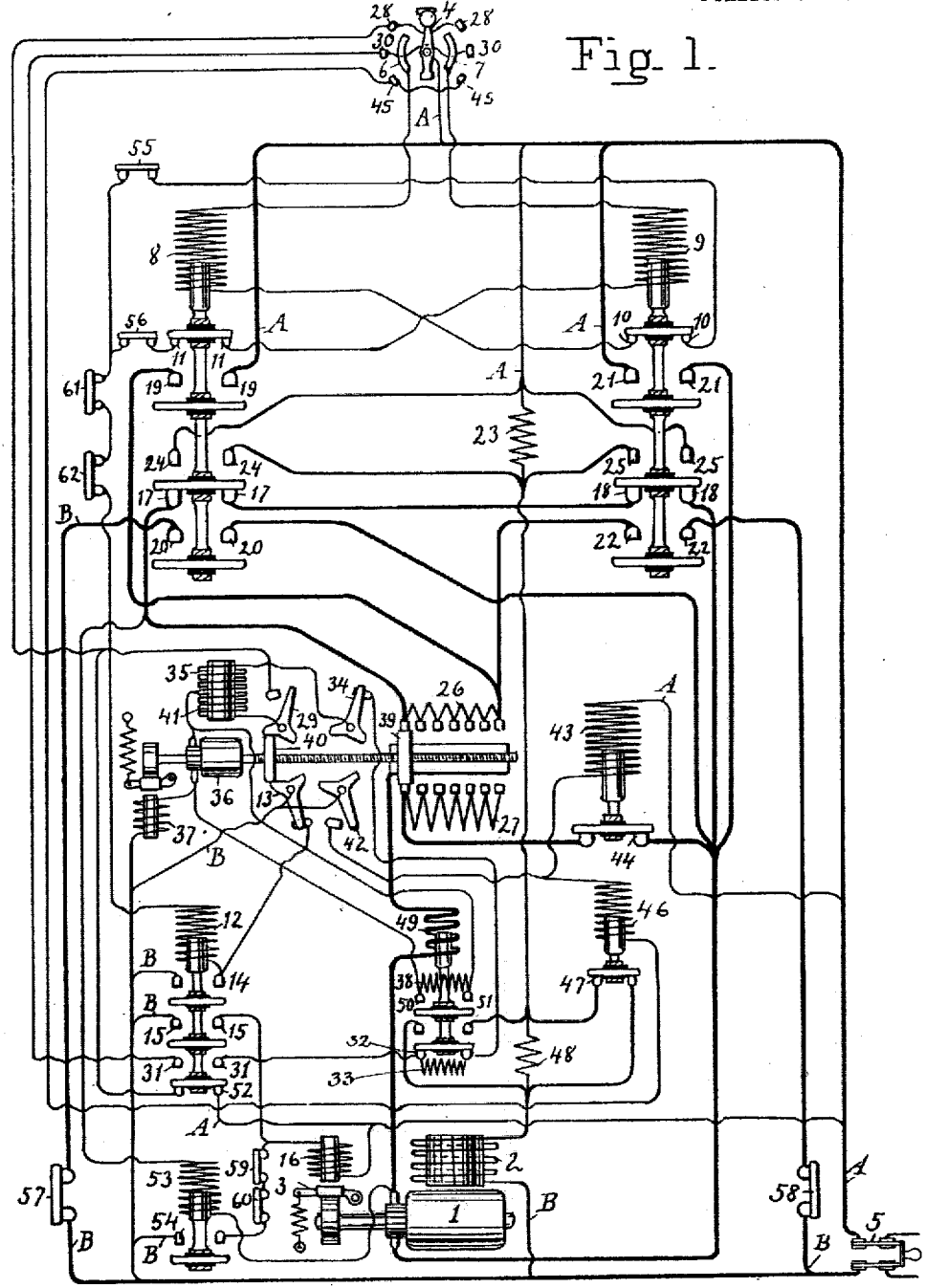

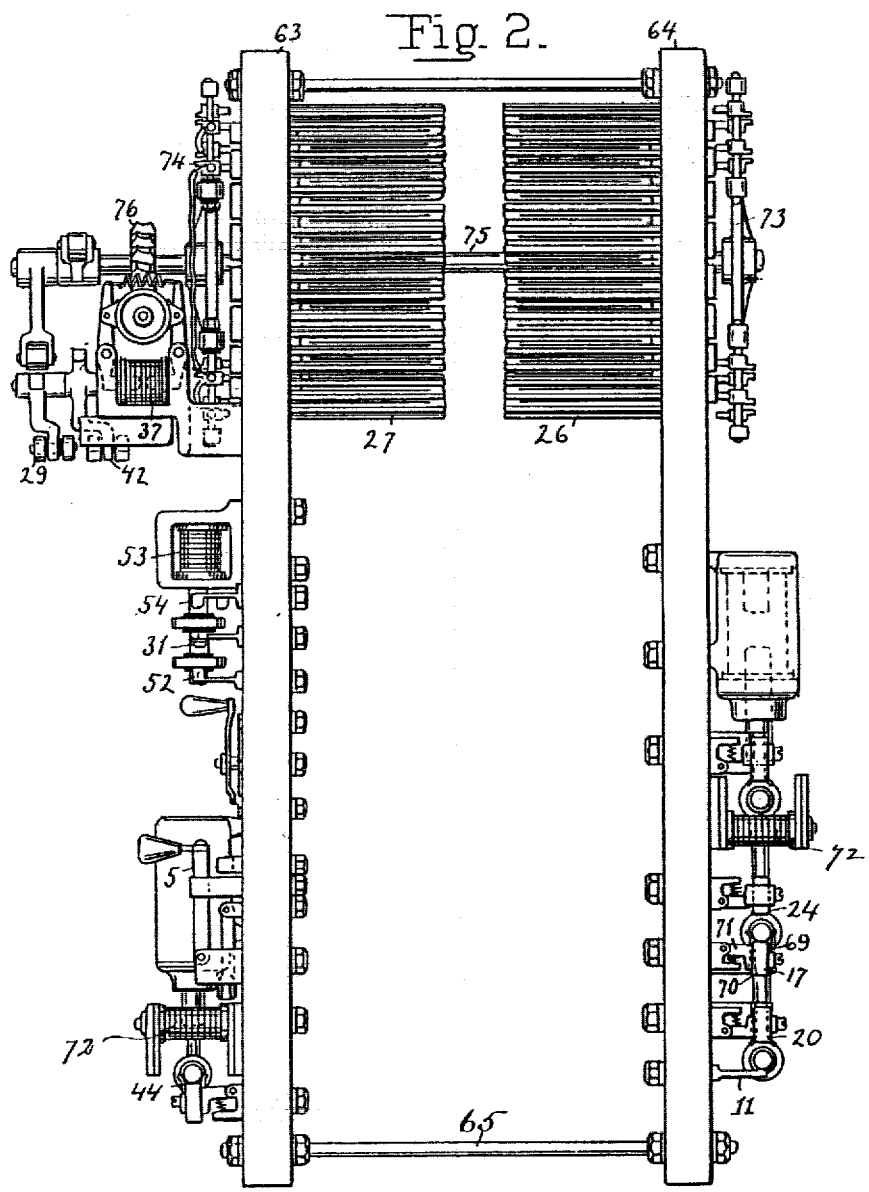

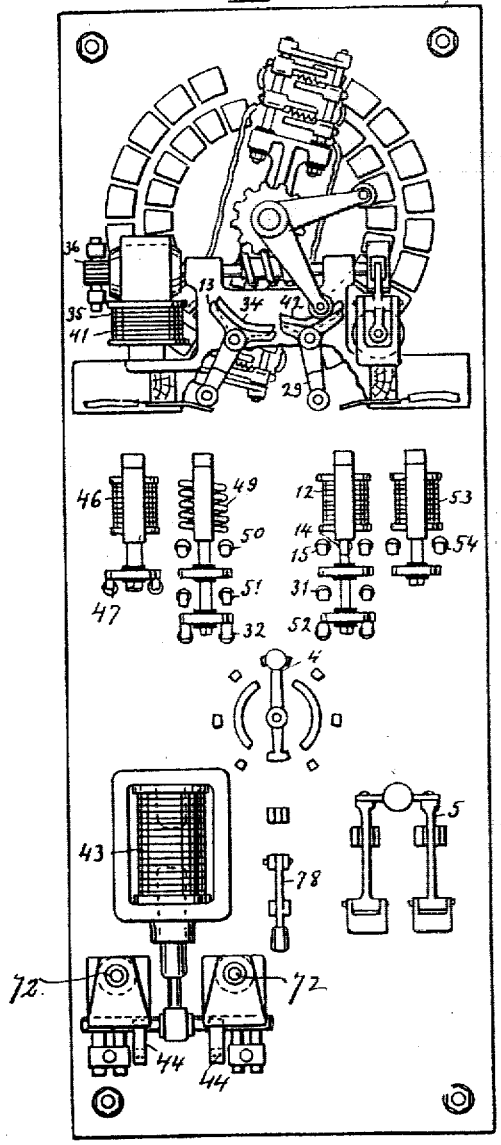

No. 815,756. PATENTED MAR. 20, 1906.
F. J. SPRAGUE.
SYSTEM OF ELECTRICAL CONTROL.
APPLICATION FILED SEPT. 22, 1898.

4 SHEETS—SHEET 4.

Witnesses:
Samuel W. Balch
Hy H. Whitman

Inventor.
Frank J. Sprague,
by Thomas Ewing, Jr.,
Attorney.

UNITED STATES PATENT OFFICE.

FRANK J. SPRAGUE, OF NEW YORK, N. Y., ASSIGNOR TO SPRAGUE ELECTRIC COMPANY, A CORPORATION OF NEW JERSEY.

SYSTEM OF ELECTRICAL CONTROL.

No. 815,756.  Specification of Letters Patent.  Patented March 20, 1906.

Application filed September 22, 1898. Serial No. 691,627.

*To all whom it may concern:*

Be it known that I, FRANK J. SPRAGUE, a citizen of the United States of America, and a resident of the borough of Manhattan, in the city, county, and State of New York, have invented certain new and useful Improvements in Systems of Electrical Control, of which the following is a specification, for which provisional application for patent was filed in Great Britain on February 23, 1898, No. 4,549, and application for patent was filed in France March 3, 1898, and issued June 13, 1898, No. 276,549.

These improvements relate especially to a system of electrical control for translating devices, such as a motor or group of motors, used to drive an elevator or for other purposes. The motors are to run in either direction at speeds controllable within certain limits. They are called upon to maintain any desired speed while running against any load up to their full capacity and may be called upon to hold their speed when connected to machinery that drives them and causes them to act as generators.

The invention consists in providing for the motors controller mechanisms which are controlled from the car by an operator's or master or governing switch, the controller mechanism of any system being brought by the operator's switch of that system into such definite relations to the motor as to secure different speeds of the motor by closing the operator's switch at any one of several contacts. These relations will be called "speed relations" of the controller mechanism to the motor. Pilot mechanism is provided for running the controller mechanism or a part of it, and circuit-openers are provided for opening the circuit of the pilot mechanism automatically or independently of the operator's switch when the controller has been brought into that speed relation to the motor which closure of the appropriate contact of the operator's switch is intended to establish, and the circuits are so arranged that the controller mechanism cannot be operated from initial position to full-working position corresponding to the fastest speed of the elevator without bringing the controller mechanism first into a relation with the motor corresponding to an intermediate speed of the motor. This is because means are provided for bringing the contact of the operator's switch which corresponds to full speed of the motor into operative connection with the controller mechanism only when the controller mechanism has attained the intermediate speed relation. The restoration of the controller mechanism to initial relation may be effected, however, by closing the operator's switch at a stop-contact or by opening it without respect to its position at the moment that it is open, means being provided for automatically restoring the controller mechanism to initial position. This means for restoring the controller to initial position acts independently of the operator's switch, and therefore automatically in this sense that after the circuit is once opened at the operator's switch or elsewhere or upon any failure of the current the operator's switch loses control of the system and the controller is restored to initial position, no matter how the operator may manipulate his switch. When the controller is restored to initial position, the operator's switch is again restored to control. This is effected by a circuit-opener actuated by the movement of the controller and a magnetically-operated bridging-contact, in conjunction with the cut-out switch, hereinafter described fully. The operator's switch if on a contact corresponding to full speed of the main motor must then be moved toward normal position, for reasons above stated, before the controller mechanism can be again advanced. The general method of controlling the speed of the main motor is to obtain an intermediate speed by connecting the motor to the source of supply through a rheostat and cutting resistance out from the circuit of its armature, the motor-armature being at first shunted by a gradually-increasing resistance and the shunt-circuit being finally opened. Full speed is attained by decreasing the field strength of the main motor after the resistance in the armature-circuit has been reduced. Too rapid change in the strength of the current in the main motor is provided against by the introduction of a throttle, which controls the speed of the controller preferably by controlling the current delivered to the pilot-motor which moves it, and too large a current is also provided against by strengthening the field of the main motor; and with these various elements forming the system here described is combined a brake for the main motor and provision for holding the brake off, preferably by means of the current generated by the main motor itself while the main motor is slowing down after the circuit has been opened.

In addition to the foregoing the invention consists in details of construction of the apparatus hereinafter described.

Figure 6:
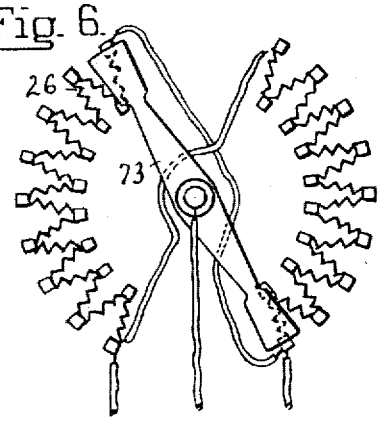
Figure 7:
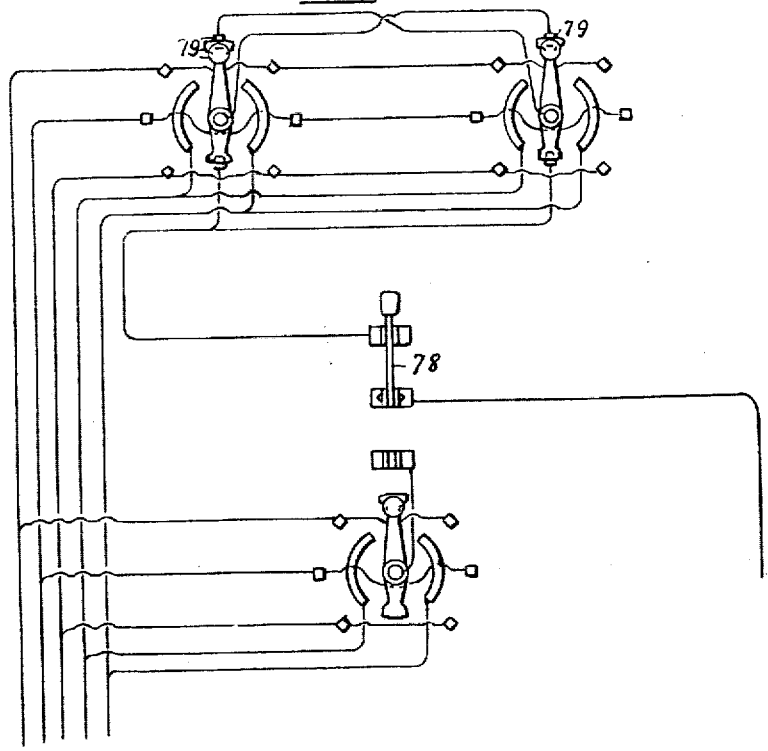

In the accompanying four sheets of drawings, which form a part of this specification, Figure 1 is an electrical diagram showing the connections between the various parts of the control apparatus, the motor, and the source of supply of current. Fig. 2 is a side view of two slates on which the various parts of the control apparatus are mounted. Fig. 3 is a front view of one of the slates, showing the parts of the control apparatus mounted thereon. Fig. 4 is a front view of the other slate, showing the parts of the control apparatus mounted thereon. Fig. 5 is a diagram showing the connections of the shunt resistances by which the motor is shunted. Fig. 6 is a diagram showing the connections of the series resistance or rheostat for regulating the current through the motor from the source of supply. Fig. 7 is an electrical diagram which shows the method of connecting a plurality of operators' switches to the control apparatus.

The diagram Fig. 1 shows the system of control applied to a shunt-wound motor, the arrangement being such that the armature 1 of the motor can be connected to and disconnected from a suitable source of current-supply, so that the current will pass through the armature in either direction, as may be required, while the field of the motor is connected to the source of supply always in one direction. The control of the motor is effected by suitably controlling the current through its field and its armature by the introduction of resistances into their circuits and by shunting the armature and by an electrically-controlled brake 3. The circuits of the armature, field, and brake are under the control of an operator's or master switch 4 and various regulating and safety devices which act through suitable relay apparatus.

The current for all of the electrical circuits is led from a suitable source of current-supply to two conductors A B through a main switch 5, by which the entire system can be connected or disconnected. The conductors A B are branched, so that connection can be made with them at various points. The switch-arm of the operator's switch is connected with the lead A and traverses contact-blocks on two concentric circles, so that circuits can be simultaneously closed at a contact on each circle. The contacts on the inner circle close circuits which determine the direction of movement of the motor, and the contacts on the outer circle close circuits which determine its speed of movement. The circuits for determining direction will first be considered.

*Control of direction.*—There are two contacts 6 and 7 on the inner circle, which are so placed that the switch will be closed through one or the other, according as the switch-arm is moved in one direction or the other from the middle position, which it takes when the switch is open. This closure through one contact or the other is maintained throughout the entire movement of the switch-arm in either direction from its middle position. Wires lead from these contacts to relay-coils 8 and 9, one of which controls a set of contacts for connecting the motor to the source of supply in one direction, and the other of which controls a set of contacts for connecting the motor with the source of supply in the opposite direction. The circuit through each relay-coil is through a pair of contacts 10 or 11, which are opened when the other relay-coil is energized, so that one relay-coil cannot be energized if the other relay-coil is energized and its armature lifted, and both relays cannot operate simultaneously. After passing these contacts both the circuits are united and pass through the coil of a stop-relay 12, and from this, when the parts are in their initial position, through a cut-out switch 13, which is closed to lead B. The stop-relay upon operating its armature closes the circuit through its coil around the cut-out switch at a pair of bridging-contacts 14 to lead B, so that the circuit through the stop-relay will not be broken upon the subsequent opening of the cut-out switch. The stop-relay also closes a second pair of contacts 15, which completes a circuit between the leads through a brake-magnet coil 16, which thereby releases the motor.

The leads from the armature-terminals of the main motor have a number of branches through which the armature-circuit may be established. When neither of the relays 8 or 9 is energized, the motor-armature is closed upon itself across two pairs of contacts 17 and 18, which are in series with each other. The pair of contacts 17 is controlled by the relay 8 and is opened by the operation of this relay. The other pair of contacts 18 is controlled by the relay 9 and is opened by the operation of this relay. This circuit is therefore opened upon the energizing of either relay and is closed when both relays are deënergized. On the operation of relay 8 through the closure of the operator's switch at the contact-block 6 one branch of one of the leads from the main motor-armature is connected, through a pair of contacts 19, to lead A, and a branch of the other lead from the armature is connected, through a pair of contacts 20, to lead B. In like manner on the operation of relay 9 through the closure of the operator's switch at the contact-block 7 one of the leads from the armature is connected, through a pair of contacts 21, to lead A, and one branch of the other lead from the armature is connected, through a pair of contacts 22, to lead B. These relays connect the leads from the motor-armature to the leads A and B of the source of supply in opposite directions, and the connections effected by one relay cause the motor to revolve in one direction, and the connections effected by the other relay cause the motor to revolve in the opposite direction.

The field-coil of the motor is permanently connected to the leads A and B; but when the parts are in the position of rest shown in the diagram there is a field resistance 23 in series with the field-coil to save current. Around this resistance are two shunts, one of which is closed through contacts 24 when the relay 8 is energized, and the other of which is closed through contacts 25 when the relay 9 is energized. The operation of either relay consequently cuts out this resistance and causes the field to rise to its full strength. Immediately on the energizing of either relay 8 or 9 the armature of the motor is connected to the leads of the source of supply through the resistances 26 of the rheostat. At the same time the armature is shunted through another branch in which shunt resistances 27 can be cut in. Under these conditions the armature will revolve slowly.

*Control of speed.*—The speed of the main motor is controlled by apparatus which is called, broadly, "controller" mechanism. This embraces a controller which comprises resistances included in the armature-circuit of the main motor and in the shunt around the armature-circuit of the main motor when the main motor is connected to the source of supply. The controller is provided with suitable pilot mechanism for moving it—as, for example, a pilot-motor, with proper limit and other switches to control the movement of the pilot-motor, and therefore of the controller. In addition to the resistances there is also provided contacts for opening the shunt around the main motor. The controller mechanism also embraces in addition to the controller a magnetic device for increasing the resistance in the field-circuit of the main motor and a suitable switch operated by the pilot-motor in conjunction with the controller which is closed after the controller has reached or approached the limit of its motion from initial position. The main motor is controlled from the operator's switch on the car through the controller mechanism, and the operator's switch in addition to the directional contacts already discussed is provided with certain speed-contacts, the effect of closure of which in different conditions of the controller mechanism will now be discussed. There are three pairs of speed-contacts. The two contacts of each pair are connected together and disposed in corresponding position on the two sides of the switch. The closure of the switch at one side or the other on the first of these contacts 28 produces no effect if the system is in its initial position, since the circuit leading from this contact is opened at the full-off-limit switch 29, controlled by the pilot-motor and the controller. This first pair of contacts is used only in returning the controller toward or to initial position to slow down or stop the main motor. The closure of the switch at one of the second or intermediate contacts 30, which is used for bringing the controller mechanism to an intermediate speed relation with the main motor, closes a circuit through the contacts 31 of the stop-relay through the shunt 32, which is normally closed across a resistance 33, through the full-on-limit switch 34, controlled by the pilot-motor, which is closed except when the controller is at the full-on limit of its movement, through one part of the field-coils 35 of the pilot-motor, then through the armature 36 of the pilot-motor and the coils of a magnet 37, which lifts the brake from the pilot-motor, and thence to lead B. This starts the pilot-motor, the speed of which is regulated by a resistance 38, which is in a shunt around the armature of the pilot-motor, as will be explained farther on. The pilot-motor in revolving causes the contact-block 39 and the nut 40 to travel along its threaded shaft. The contact-block gradually cuts into circuit the shunting resistances 27 and gradually cuts out of circuit the series resistances 26 of the rheostat, these two resistances being varied oppositely and being predetermined by their construction. The nut 40 throws certain switches, as follows: When the pilot-motor is started, the full-off-limit switch 29 is closed by the engagement of the nut, and the cut-out switch 13 is then opened. The closure of the full-off-limit switch makes it possible to close a circuit through either of the first pair of contacts 28 of the operator's switch. It will be seen that the circuit which is closed at these contacts is through the field-coil 41 of the pilot-motor. By closing the operator's switch on either of the second pair of contacts and holding it there the pilot-motor will be run until the resistances 26 are cut out of the circuit through the main motor and source of supply, and the shunting resistances 27 are cut into the shunt-circuit of the armature, and the motor will thereby be speeded up. Closure now of the operator's switch at either of the contacts 28 will energize field-coil 41 of the pilot-motor, which is connected to the circuit oppositely to coil 35. This will reverse the pilot-motor and cut in the resistances 26 of the rheostat and cut out the shunting resistances 27, and the main motor will thereby be slowed down. If the operator's switch is held on either pair of contacts 28 or 30 for a length of time insufficient for the pilot-motor to move the controller through the entire extent of its movement and throw its limit-switches and the operator's switch is then opened at the speed-contacts, but held closed at one of the directional contacts, the contact-block will be left in an intermediate position and the main motor will run at corresponding speed. These contacts 28 and 30 are termed "speed-controlling" contacts, since closure at one or the other enables the speed of the main motor to be graduated. The main motor, however, is not stopped by contact at either speed-contact so long as the circuit is maintained at either of the direction-controlling contacts. If the circuit is closed at the contact 30 of the operator's switch for a sufficient time, the pilot-motor will run until it closes the shunt-opener switch 42 and then automatically interrupt its own circuit at the full-on-limit switch and stop further forward movement of the controller. The closure of the shunt-opener switch completes a circuit which includes the coil 43 of the shunt-opener 44, and the shunt-circuit is opened and held open. It will thus be seen that the shunt around the armature of the main motor is varied by changing its resistance and by opening and closing it.

The foregoing operation establishes a definite intermediate speed relation between the controller mechanism and the main motor, the word "definite" being used to indicate a relation to which the mechanism can be brought with precision, and the expression "speed relation" being used to indicate the position of the controller mechanism whereby the main motor is connected to the source of supply in a given manner. This is effected by closing the operator's switch at a proper contact for a sufficient length of time. A further increase of speed of the main motor is effected on closing the operator's switch at one of the third pair of speed-contacts 45, which may be termed the "full-speed" contact. The circuit is through the coil 46 of the speed-relay 47. This relay opens a shunt around a resistance 48, which is in series with the field-circuit of the motor, thus decreasing the field strength of the main motor and causing the motor to speed up. This is another definite speed relation between the controller mechanism and the main motor. This second-named definite speed relation cannot be established until after the controller has been fully operated and the first-named definite speed relation has been attained by the controller mechanism. This is because the full-speed contacts of the operator's switch are not brought into operative relation with the system, nor can the field strength of the main motor be diminished until by the closure of an intermediate speed-contact of the operator's switch the controller is operated and closes the shunt-opener switch 42.

It will be seen that the switch 34, which is operated by the motor-controller, constitutes, either alone or in combination with the intermediate speed-contacts of the operator's switch, a set of contacts which are so arranged that the circuit of the armature of the pilot-motor is automatically interrupted only after it has made a predetermined number of revolutions, and the switch 42, either alone or in combination with the full-speed contacts of the operator's switch, constitutes a second set of contacts, which are brought into operative relation as soon as and in practice slightly before the circuit of the first set of contacts is interrupted.

In series with the circuit through the armature of the main motor is a coil 49 of a throttle, the coil consisting of a few turns of the heavy wire which conducts the armature-current and being therefore dependent in its operation upon the strength of the current in the main circuit. This throttle is so adjusted that in event of the current through the armature rising above a safe amount the circuit of the pilot mechanism it shunted. This is effected by closing contacts 50, which short-circuits the armature of the pilot-motor. At the same time the contacts 32 will be opened and the resistances 33 will be cut into the pilot-motor circuit, thus decreasing the current through the pilot-motor. Thus movement of the controller is checked or arrested. The operation of the throttle also closes contacts 51, which cut out the resistance 48 of the field-coil of the main motor in event of its having been cut in by the speed-relays, and thereby insures a strong field to oppose the excessive current in the armature of the main motor.

If while the motor is connected to the source of supply the operator's switch is opened, thus opening the controlling-circuit, or the circuit is opened at any other point or the current fails from any cause, the stop-relay will at once drop its armature. This will also open the circuit at the contacts 14. Control is thus taken away from the operator's switch, and it cannot be restored until the controller mechanism is restored to its initial position and closes the circuit at the cut-out switch 13. Upon the interruption of the controlling-circuit the relay-armature, by which the motor-armature is connected to the source of supply, is at once dropped, and the motor-armature is disconnected and is closed upon itself across the contacts 17 and 18 through the resistances 26 of the rheostat. The armature of the stop-relay upon dropping closes contacts 52 and establishes a circuit through the pilot-motor, which effects the return of the controller mechanism to its initial position independently of any manipulation of the operator's switch, and therefore automatically. Immediately on the controller mechanism starting back it opens the circuit of the shunt-opener coil at the shunt-opener switch 42 if the latter has been thrown, and the shunt-opener drops its armature, thus closing through the shunt resistances 27 a second shunt to the motor-armature. The return of the controller mechanism cuts out the resistances 26 and 27 in the two shunts and slows down the motor. A portion of the current generated in the motor-armature while it is slowing down passes through a brake relay-coil 53, thereby causing it to attract its armature and to close at the contacts 54 a circuit through the brake-coil. Thus the brake is held off by means operated with current generated by the motor and is delayed until the motor-armature has nearly come to rest.

It is obvious that the brake is controlled from the operator's switch in combination with the controller and the cut-out switch and the bridging contact and other means whereby control is taken away from the operator's switch and the controller is restored to initial position. The operation of these parts has already been fully explained, and it is sufficient at this point to call attention to the fact that the brake coöperates with them in the operation of the system.

In applying the system of control to a motor which is used to run an elevator in the manner shown, for example, in my United States application, Serial No. 687,009, filed July 27, 1898, it is important that there should be automatic devices for stopping the mechanism when the car approaches both the upper and lower limits of travel. For this purpose arms are provided which are geared to and move synchronously with the elevator mechanism. These are so arranged and adjusted that they engage and open a series of switches when the car nears either limit of travel. Thus if the relay-coil 8 is energized when the elevator is descending there will be placed in circuit with it a switch 55, which will be opened as the lower limit of travel is approached, and in circuit with the relay-coil 9 will be the switch 56, which will be opened as the upper limit of travel is approached. Opening either of these switches effects the stoppage of the motor in the same way as opening the circuit at the operator's switch. The relay-coil 8 or 9 is deënergized and drops its armature, thus instantly disconnecting the armature of the main motor from the source of supply and closing it upon itself. At the same time the brake relay-coil 53, through which the brake is held off, is cut off from the source of supply, but current generated in the motor is still permitted to pass through this coil, so that the brake will not be applied until the motor comes to rest. These two limit-switches in the two branches of the controlling-circuit are sufficient to stop the elevator at its limits of travel, provided that the control apparatus is in proper working condition; but as an additional precaution extra limit-switches 57 and 58 are included in the main circuits of the motor-armature to insure the opening of these circuits in event of the armatures of the relay-coils failing to drop when they are deënergized. There is also a third set of limit-switches 59 and 60, which are opened to insure the application of the brake. These switches are opened after the switches in the controlling-circuit. In the controlling-circuit there is also a switch 61, which is opened by a centrifugal governor, and a switch 62, which is opened in event of the hoisting-ropes becoming slack or failing to wind properly.

Before describing the details of construction of the apparatus used it may be pointed out that many changes may be made in the foregoing arrangements without departing from the spirit of the invention. For example, a controller might be arranged which can be restored to initial position by moving on in the same direction as it moves from initial position instead of, as shown, returning over the path it has traveled from initial position. Moreover, the controller might be arranged to move to various definite positions, one in advance of the other, when the operator's switch is closed at successive contacts instead of having but one stage of movement of the controller and then, as shown, operating some other device which forms a part of the controller mechanism, and the controller might be used to control a plurality of motors by changing the connections thereof relatively to each other. Many other changes can be made, as will readily be seen.

Referring now to the details of construction of the apparatus, Figs. 2 to 7 show the various parts of the control apparatus as this is preferably constructed. These parts are attached to two slates 63 and 64, which are connected together in parallel position by stay-rods 65. The various relays are in the form of solenoid-coils, which are set in iron yokes 66 and when energized attract iron plungers 67, which pass through openings in the yokes into the coils. Insulated contact-bars carried by the plungers make the contacts for the heavy currents with copper springs 69 and carbon blocks 70, which are connected together. The carbon blocks are carried in spring-pressed holders 71, which have a slight movement in the direction in which contact is made and broken, so that when contact is broken the carbon will follow the contact-bar and maintain contact until it has separated from the copper springs. The final break of the contact is therefore always at the carbon blocks. The break is made between the poles of blow-out magnets 72.

Fig. 7 shows how three operator's switches may be provided so that the control apparatus can be operated from either one of the switches, conflicting circuits through the other switches being prevented. Thus there is a throw-over switch 78 in the circuit between the lower of the three operator's switches and the upper two. The upper switches cannot mutually interfere, since the circuit to each includes a contact 79 of the other, which is closed while an operator's switch is in its normal open position, but is open in every other position thereof.

Having now described my invention and the best means known to me for carrying it out without limiting myself to the details shown, what I claim, and desire to secure by Letters Patent of the United States, is—

1. The combination of a source of supply, a motor, a controller mechanism therefor embracing a resistance connected in circuit with the armature of the motor and a resistance connected in series with the field of the motor, an operator's switch for actuating the controller mechanism provided with a plurality of contacts, means for connecting the motor to the source of supply and for actuating the controller mechanism for reducing the resistance in circuit with the armature of the motor by closing the operator's switch at one of its contacts, and means for actuating the controller mechanism for decreasing the field strength of the motor by closing the operator's switch at another of its contacts, substantially as described.

2. The combination of a motor, a source of supply, means for connecting the motor to the source of supply, a shunt around the motor, a controller for the motor, and means for opening the shunt when the controller is brought to a predetermined position, substantially as described.

3. The combination of a motor, a source of supply, means for connecting the motor to the source of supply, a shunt around the motor, a controller for the motor, means for varying the resistance of the shunt when the controller is operated, and means for opening the shunt when the controller is brought to a predetermined position, substantially as described.

4. The combination of a motor, a source of supply, a main circuit for connecting the motor to the source of supply, a shunt around the motor when so connected, a controller for the motor, and means for varying the resistance in the main circuit and in the shunt oppositely in the operation of the controller, substantially as described.

5. The combination of a motor, a source of supply, a main circuit for connecting the motor to the source of supply, a shunt around the motor when so connected, a controller for the motor, means for varying the resistance in the main circuit and in the shunt oppositely, and means for opening the shunt when a predetermined resistance has been cut out of the main circuit and a predetermined resistance brought into the shunt, substantially as described.

6. The combination of a motor, a motor-circuit, a controller for the motor, means for operating the controller, means for opening the motor-circuit independently of the controller, and means for restoring the controller to initial position independently of the said controller-operating means, substantially as described.

7. The combination of a motor, a motor-circuit, a controller for the motor, an operator's switch in circuit for operating the controller, means for opening the motor-circuit independently of the controller, means for restoring the controller to initial position independently of the operator's switch, and a cut-out switch connected with the controller and closed in certain positions thereof, which, when it is closed, restores control of the controller to the operator's switch, substantially as described.

8. The combination of a motor, controller mechanism therefor, a cut-out switch arranged to be opened when the controller mechanism is moved from initial position, and a bridging contact for closing the circuit around the cut-out switch, the said contact being arranged to be opened automatically when the circuit is opened, substantially as described.

9. The combination of a motor, controller mechanism therefor, a cut-out switch arranged to be opened when the controller mechanism is moved from initial position, a bridging contact for closing the circuit around the cut-out switch, the said contact being arranged to be opened automatically when the circuit is opened, and means for restoring the controller to initial position and closing the cut-out switch, substantially as described.

10. The combination of a motor, controller mechanism therefor, an operator's switch for operating the controller mechanism, a cut-out switch arranged to be opened when the controller mechanism is moved from initial position, a bridging contact for closing the circuit around the cut-out switch, the said contact being arranged to be opened automatically when the circuit is opened, thus taking control from the operator's switch, and means for restoring the controller to initial position and closing the cut-out switch independently of the operator's switch, thus restoring control to the operator's switch, substantially as described.

11. The combination of a translating device, a controller therefor, an electrical pilot mechanism for operating the controller, a main circuit in which the translating device is connected, and means dependent on the strength of the current in the main circuit for arresting the controller by short-circuiting the circuit of the pilot mechanism, substantially as described.

12. The combination of a translating device, a controller therefor, a pilot-motor for moving the controller, a main circuit in which the translating device is connected, and means dependent on the strength of the current in the main circuit for arresting the movement of the controller by short-circuiting the armature of the pilot-motor, substantially as described.

13. The combination of a motor, a controller therefor, a main circuit in which the motor-armature and controller are connected, means for operating the controller, and means dependent on the strength of the current in the main circuit for arresting the movement of the controller, and increasing the strength of the field of the motor, substantially as described.

14. The combination of a motor, a controller therefor, an operator's switch, means connected therewith for operating the controller, a brake for the motor, means connected with the operator's switch for operating the brake, and means independent of the operator's switch for restoring the controller to initial position and for holding the brake off while the motor is slowing down, substantially as described.

15. The combination of a motor, a controller therefor, an operator's switch, means connected therewith for operating the controller, a throttle which varies the operation of the controller independently of the operator's switch, means for restoring the controller to ititial position independently of the operator's switch, and means for holding the brake off from the motor while it is slowing down, substantially as described.

16. The combination of a motor, a motor-circuit, a controller for the motor, means for operating the controller, means for opening the motor-circuit independently of the said controller-operating means, a brake for the motor, means for operating the brake in conjunction with the controller, and means for holding off the brake while the motor is slowing down, substantially as described.

17. The combination of a motor, a controller therefor, a cut-out switch which is closed in certain positions of the controller, an operator's switch, a brake for the motor, means for operating the controller and the brake from the operator's switch, means for opening the circuit independently of the controller, and means for closing the cut-out switch to restore control to the operator's switch, substantially as described.

18. The combination of a motor, a controller therefor, an operator's switch, and means connected therewith for operating the controller, a brake for the motor, means connected with the operator's switch for operating the brake, means independent of the operator's switch for restoring the controller to initial position, and means for holding the brake off with current generated by the motor, while the motor is slowing down, substantially as described.

19. The combination of a motor, a controller therefor, an operator's switch, and means connected therewith for operating the controller, a throttle which arrests the operation of the controller independently of the operator's switch, means for restoring the controller to initial position independently of the operator's switch, and means for holding the brake off with current generated by the motor, while it is slowing down, substantially as described.

20. The combination of a motor, a motor-circuit, a controller for the motor, means for operating the controller, means for opening the motor-circuit independently of the said controller-operating means, a brake for the motor, means for operating the brake in conjunction with the controller, and means for holding the brake off with current generated by the motor, while the motor is slowing down, substantially as described.

21. The combination of an electric motor with means for disconnecting the armature from its source of supply and simultaneously putting it in short circuit to act as a generator, and automatic means for applying a friction-brake when the generator action becomes weak, substantially as described.

22. The combination of an electric motor, with controlling devices for simultaneously disconnecting the armature of the motor from its source of supply and putting it in short circuit to act as a generator, and automatic means for applying a friction-brake when the generator action becomes weak, substantially as described.

23. A combined magnetic and friction brake for electric motors, comprising means for disconnecting the motor-armature from the source of supply and putting it in short circuit to act as a generator, and a magnetic controlling device for releasing the friction-brake when the current in the short circuit slackens to a low value, substantially as described.

24. The combination in an electrical system, of a motor, means for reversing the connection of the motor with the source of supply, means for closing a short circuit around the motor to cause it to act as a generator, and a magnetic controlling device for releasing the friction-brake when the current in said short circuit declines to a low value, substantially as described.

25. The combination in an electrical system, of a motor, means for reversing the connection of the motor with the source of supply, means operative irrespective of the direction of the motor connection with the source of supply for closing a short circuit around the armature thereof, and for causing it to act as a generator, and a magnetic controlling device for releasing the friction-brake when the current in said short circuit declines to a low value, substantially as described.

26. The combination in an electrical system, of a motor, circuit connections for putting the motor on short circuit to act as a generator, means operative at will for establishing the said connections, and a magnetic controlling device for releasing the friction-brake when the current in the short circuit declines to a low value, substantially as described.

27. The combination in an electrical system, of a motor, a source of supply therefor, controlling means for creating a short circuit around the motor to cause it to act as a generator, and a magnetic controlling device for releasing the friction-brake when the current in the short circuit declines to a low value, substantially as described.

28. The combination of a source of current-supply, a motor, controller mechanism therefor, embracing a controller, pilot mechanism for the controller, a set of contacts for controlling the pilot mechanism so arranged that the circuit of the pilot mechanism is automatically interrupted after the controller has reached its extreme running position, an operator's switch having a plurality of contacts, means for bringing the controller to said extreme running position by closing at one of the contacts of the operator's switch, and means for subsequently giving the controller mechanism a different speed relation with the motor by closing at another of the contacts of the operator's switch.

29. In combination with a member to be moved, a manually-controlled switch for controlling the operation of said member electrically, and a second manually-controlled switch for controlling the operation of said member electrically through a contact controlled by the first switch.

30. In combination with a member to be moved, a plurality of switches including a manually-operated switch for controlling the operation of said member electrically and independently of each other, the control-circuit of one of said switches being controlled by the other switch.

31. In combination, a motor, a plurality of switches each of which controls the operation of said motor in like direction or directions, and means associated with one of said switches for governing the control-circuit of another of said switches.

32. In combination, a motor, a plurality of switches each of which controls the operation of said motor in like direction or directions, and a contact arranged in the control-circuit of one of said switches and controlled by another of said switches.

33. In combination, a motor, a plurality of switches each of which independently controls the operation of said motor in like direction or directions, and a contact arranged in the control-circuit of one switch and controlled by another switch.

34. In combination, a motor, and a pair of switches for controlling the operation of said motor, each of which switches controls said motor for forward and reverse operation through a contact controlled by the other switch.

35. In combination, a motor, a pair of switches for controlling the operation thereof in like direction or directions independently of each other, and a contact in the control-circuit of one of said switches arranged to be closed when the other switch is in its inoperative position.

36. In combination, a motor, a pair of switches for controlling the operation thereof in like direction or directions independently of each other, and a contact in the control-circuit of each of said switches arranged to be closed when the other switch is in its inoperative position.

Signed by me in New York city this 21st day of September, 1898.

FRANK J. SPRAGUE.

Witnesses:
SAMUEL W. BALCH,
CHAS. M. SPRAGUE.